(12) United States Patent
Miller et al.

(10) Patent No.: US 10,183,706 B2
(45) Date of Patent: Jan. 22, 2019

(54) NODES FOR FRAME STRUCTURES

(71) Applicant: Caterpillar Inc., Peoria, IL (US)

(72) Inventors: Tad Miller, Oreana, IL (US); Arun L. Gain, Champaign, IL (US); Stan Eads, Forsyth, IL (US)

(73) Assignee: Caterpillar Inc., Deerfield, IL (US)

( * ) Notice: Subject to any disclaimer, the term of this patent is extended or adjusted under 35 U.S.C. 154(b) by 25 days.

(21) Appl. No.: 15/411,418

(22) Filed: Jan. 20, 2017

(65) Prior Publication Data
US 2018/0208251 A1 Jul. 26, 2018

(51) Int. Cl.
*E04B 1/19* (2006.01)
*B62D 21/11* (2006.01)
*B62D 25/08* (2006.01)
*B62D 27/02* (2006.01)
*B62D 63/02* (2006.01)

(52) U.S. Cl.
CPC ............ *B62D 27/023* (2013.01); *B62D 21/11* (2013.01); *B62D 25/085* (2013.01); *B62D 63/025* (2013.01); *E04B 1/1906* (2013.01); *E04B 1/1909* (2013.01)

(58) Field of Classification Search
CPC .... B62D 27/023; E04B 1/1909; E04B 1/1906
USPC ..... 296/29, 205, 203.01, 30, 187.01, 193.04
See application file for complete search history.

(56) References Cited

U.S. PATENT DOCUMENTS

| 4,355,844 | A | * | 10/1982 | Fantini Muzzarelli | ........................ B62D 23/005 280/784 |
| 4,735,355 | A | * | 4/1988 | Browning | .............. B62D 21/08 228/138 |
| 5,059,056 | A | * | 10/1991 | Banthia | .............. A47B 47/0008 296/203.01 |
| 5,269,585 | A | * | 12/1993 | Klages | ................. B62D 29/008 296/201 |
| 5,324,133 | A | * | 6/1994 | Kreis | ................... B62D 21/152 228/119 |
| 5,346,276 | A | * | 9/1994 | Enning | ................ B62D 25/082 296/187.09 |
| 6,328,377 | B1 | * | 12/2001 | Makita | ................. B62D 21/152 296/203.02 |

(Continued)

FOREIGN PATENT DOCUMENTS

| DE | 4423642 | 10/1995 |
| DE | 19922880 A1 | 11/1999 |

(Continued)

*Primary Examiner* — Jason S Morrow
*Assistant Examiner* — E Turner Hicks
(74) *Attorney, Agent, or Firm* — Leydig, Voit & Mayer, Ltd.

(57) ABSTRACT

A node for interconnecting frame members of a frame, the node including a single piece node body. A plurality of cup-shaped node connectors are disposed on the node body. Each of the plurality of node connectors include a closed end attached to the node body and an open end opposite the closed end and extending away from the node body. A sidewall extends between and connects the closed end to the open end. A tenon is formed on the open end. The tenon is shaped and sized to fit within a frame member. A transition is formed between the sidewall and the tenon defining a peripheral, radially outwardly facing groove in cooperation with the frame member, the groove shaped and sized to receive a weld.

20 Claims, 7 Drawing Sheets

(56) References Cited

U.S. PATENT DOCUMENTS

| | | | | |
|---|---|---|---|---|
| 6,389,697 B1* | 5/2002 | Benoit | ................... | B21D 26/14 |
| | | | | 219/617 |
| 6,416,072 B1* | 7/2002 | Mochizuki | ............. | B21D 53/86 |
| | | | | 280/281.1 |
| 7,322,106 B2* | 1/2008 | Marando | .............. | B22D 19/045 |
| | | | | 29/507 |
| 7,971,887 B2* | 7/2011 | Dorr | ....................... | B62D 21/11 |
| | | | | 164/111 |
| 2007/0281523 A1* | 12/2007 | Riley | ................... | B62D 23/005 |
| | | | | 439/157 |
| 2016/0264189 A1 | 9/2016 | Gami et al. | | |

FOREIGN PATENT DOCUMENTS

| | | |
|---|---|---|
| DE | 102010033289 A1 | 2/2012 |
| FR | 940982 | 12/1948 |
| WO | 9504616 | 2/1995 |
| WO | WO 2015/175892 A1 | 11/2015 |

\* cited by examiner

NODES FOR FRAME STRUCTURES

TECHNICAL FIELD

The present disclosure relates to nodes for interconnecting space frame structures.

BACKGROUND

Many vehicles, machines and other structures are constructed on an open frame, sometimes referred to as a space frame, out of elongate structural members such as solid or hollow struts. A space frame is typically a lightweight rigid structure constructed from interlocking struts, most often in a geometric pattern. Space frames can be used to span large areas with few interior supports such as columns. Like the truss, a space frame is strong because flexing loads and bending moments are transmitted as tension and compression vectors along the length of each strut. Space frames are common in building construction such as large roof spans in modern commercial and industrial buildings. Space frames have been used for a variety of vehicle chassis wherein the engine and body panels are suspended, and the body panels have little or no structural function.

At positions where the structural members intersect and form frame junctions, the members are typically cut at angles and coped to fit to each other. In order to attach coped tubular members to each other, jigs are employed to hold the tubes while joining, typically by welding or a similar process. Alternatively, hollow castings, which may be referred to as "lugs" or "nodes," may be used at the frame junctions with the tubes fitted interiorly into the castings before welding, brazing, or soldering, for example. Hollow castings may obviate the need for the use of jigs to hold every element, but the tubes are still coped to maximize the insertion dimension of each tube into the casting. In such joining methods, there is a concentration of stress at the point of intersection of the tubes or of the tubes and the casting, especially at the weld. The set up and use of such jigs is time consuming. Also, the inspection of welds that are interior to a casting may be difficult or may require expensive test equipment.

SUMMARY OF THE DISCLOSURE

One aspect of the disclosure is a node for interconnecting frame members of a frame, the node including a single piece node body. A plurality of cup-shaped node connectors are disposed on the node body. Each of the plurality of node connectors include a closed end attached to the node body and an open end opposite the closed end and extending away from the node body. A sidewall extends between and connects the closed end to the open end. A tenon is formed on the open end. The tenon is shaped and sized to fit within a frame member. A transition is formed between the sidewall and the tenon defining a peripheral, radially outwardly facing groove in cooperation with the frame member, the groove shaped and sized to receive a weld.

Further and alternative aspects and features of the disclosed principles will be appreciated from the following detailed description and the accompanying drawings. As will be appreciated, the principles related to load carrying members for work machines disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
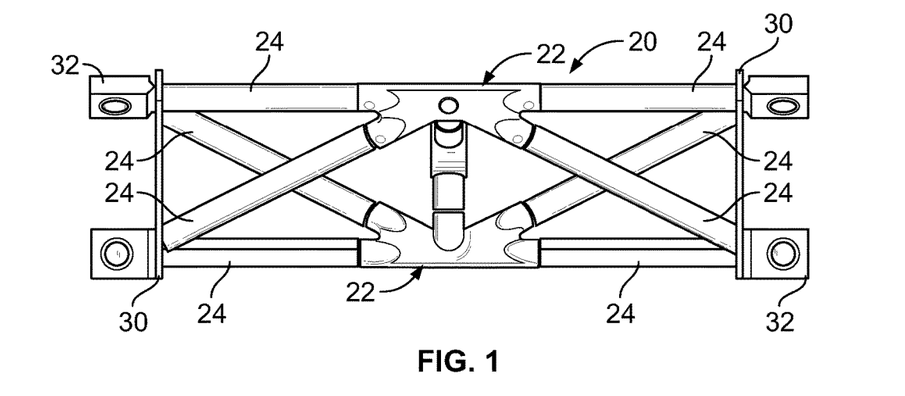
FIG. 1 is a perspective view of a tubular subframe utilizing structural nodes according to an embodiment of the present disclosure.

FIG. 1 illustrates a subframe 20 for a space frame utilizing structural nodes 22, which are fixtures where two or more strut or the like are joined, according to one embodiment of the disclosure. The illustrated subframe 20, which may constitute part of a vehicle space frame, for example, is shown to provide context to the subject structural node elements disclosed herein, and is not intended to be limiting as to configuration.

The subframe 20 is shown including a pair of structural nodes 22 that interconnect a plurality of frame members 24. The frame members 24 may each connect at one end to one of the nodes 22 and at an opposite end to a structural plate or frame part 30, another node or another subframe, for example. The frame part 30 is shown with connectors 32 that, with the use of one or more fastener (not shown), may be used to connect the subframe 20 to one or more other subframe, or to a test fixture for testing, or some other element or elements of a space frame or vehicle.

The frame members 24 may be elongate struts with any suitable cross section shape. In one embodiment, the frame members are tube-shaped—for example, hollow, cylindrical pipe-shaped elements. The ends of the frame members 24 may be open and may include circular openings formed at each end by cutting the tube perpendicularly relative to the long axis of the frame member. The frame members 24 may be butted or straight gage members. The frame members 24 may include cross sections that vary along their length, may be ovalized, rectangular, triangular, or other suitable shapes. The frame members 24, when in the form of a pipe-shaped element, may include a specified internal diameter and outer diameter.

The nodes 22 may be formed in a vast array of shapes and sizes to accommodate a wide range of configurations for interconnecting frame members 24. The nodes 22 may connect to at least one frame members 24 and at any suitable angle, and thus, can be configured to support the construction of a diverse range of subframes and frames.

Figure 2:
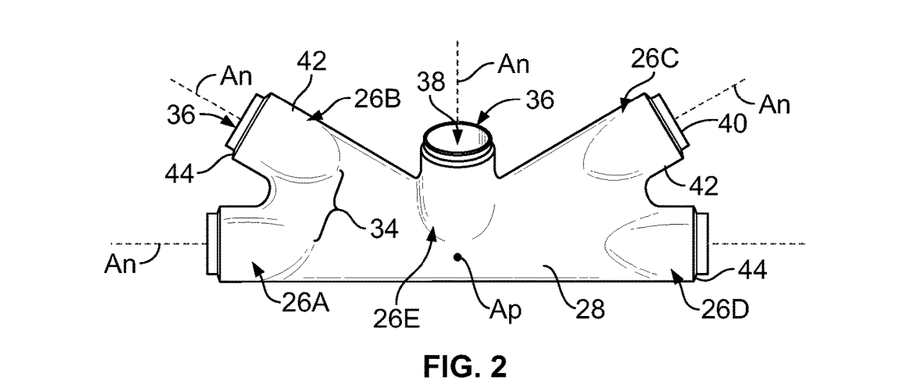
FIG. 2 is a side view of a node according to an embodiment of the present disclosure.

Referring also to FIG. 2, each node 22 includes two or more node connectors 26 that form attachment locations on the node. Each node connector 26 is sized and shaped to attach to a frame member 24. Each node 22 includes a node body 28 that supports the spacing and orientation of the node connectors 26. The node connector 26 and node body 28 will be set out in detail hereinbelow.

At least one node connector 26 is disposed on a node body 28. As will be shown in more detail below, the node connectors are "U"-shaped or a similar overall shape to define an essentially cup or egg shaped element. Each node connector 26 may be hollow to define a cup shape with an interior 38 space. The interior space 38 reduces the overall weight of the node 22 and does not significantly reduce the strength of the assembled node 22 and frame member 24.

The closed end 34 of the U-shape is oriented toward the body 28 and the open end 36 of the U-shape is oriented away from the body. The open end 36 includes a tenon 40, formed and extending from a sidewall 42 of the node connector 26, wherein the tenon is sized and shaped to fit to a corresponding inside diameter of the end of the frame member 24. In the illustrated embodiment, the tenon 40 is a round, tube-shaped extension of the sidewall 42. In the form illustrated, the tenon has an outer diameter that fits to the inside diameter of the frame member 24.

The node connector 26 may include an angled transition 44 in the form of a bevel or shoulder extending from the sidewall 42 to the tenon 40. The transition 44 slopes from the tenon 40 radially outwardly and downwardly to the sidewall 42. In the illustrated embodiment, the transition 44 is annular, shaped and sized to receive an annular end of a circular frame member 24.

In the embodiment of FIG. 2, five node connectors 26 are disposed on the node body 28. A set of four of the five node connectors 26A-D have axes (An) that lie in the same plane, which is that of the drawing page. The fifth node connector 26E has an axis (An) that is not in the plane as the mounts 26A-D. In this way, subframes and frames can be assembled that are three-dimensional. Also, two of the node connectors 26A, 26D share an axis (An). It may be a feature of some of the embodiments of the node 22, that the axes (An) of the node connectors 26 converge at a node point (Ap). The node point (Ap) may be located on the node body 28. Other embodiments of a node 22 do not feature a node point.

The node body 28 is a web of solid material that spaces the node connectors 26 apart, structurally holds each node connector in a correct angular orientation relative to the other node connectors on the node 22 and is configured to receive and distribute the load from the node connectors. The node body 28 and node connectors 26 may be cast, according to well known methods such as investment casting, in a single piece, without seams, joins, sub-assemblies, multiple parts, fasteners, adhesives or any other joining or assembling required. The node body 28 may be made of iron or iron alloys, aluminum or aluminum alloys, titanium or titanium alloys, other metal materials, composites, or any suitable material. Where made of metal materials, the node body 28 may be welded or the like to the frame members 24. Where made of composite materials, the node body 28 may be bonded to the frame members 24.

The configuration of the node connectors 26 located peripherally on the node body 28 has an effect of moving the location of the welds (see, for example, FIG. 16) away from high stress concentration points. Also, the solid material of the node body 28 serves as a flexible platform for attachment to additional structural elements and optional attachment structures, and significantly expands the functionality of the disclosed node bodies, as will be shown in subsequent embodiments.

Figure 3:
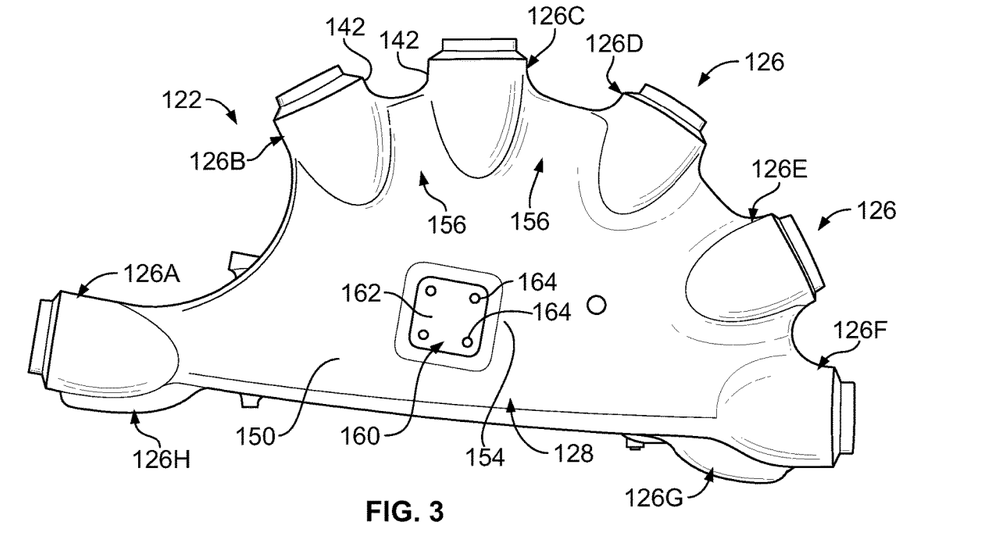
FIG. 3 is a left side view of a node according to a second embodiment of the present disclosure.

Turning to FIGS. 3-9, a node 122 is illustrated with eight node connectors 126 formed on a node body 128. FIG. 3 shows six node connectors 126A-F disposed in a first plane, i.e., that of the drawing page, which may be in an essentially vertical plane when assembled into a frame. Four of the node connectors 126A, 126F and 126G, 126H, may be disposed in a second plane, shown in FIG. 4 for example, which is substantially perpendicular to the plane of the drawing page and perpendicular to the first plane.

Figure 4:
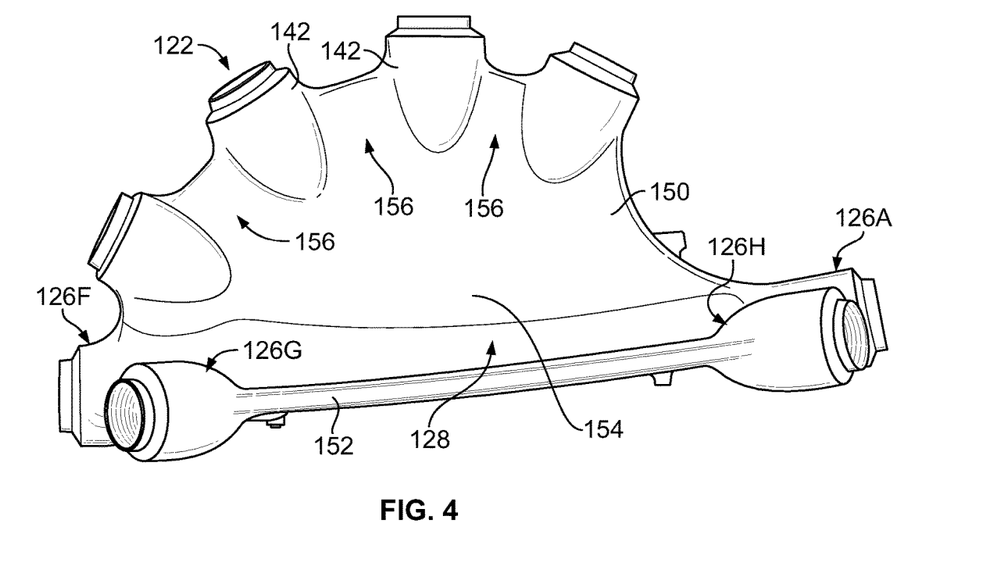
FIG. 4 is a right side view of the node of FIG. 3.
Figure 5:
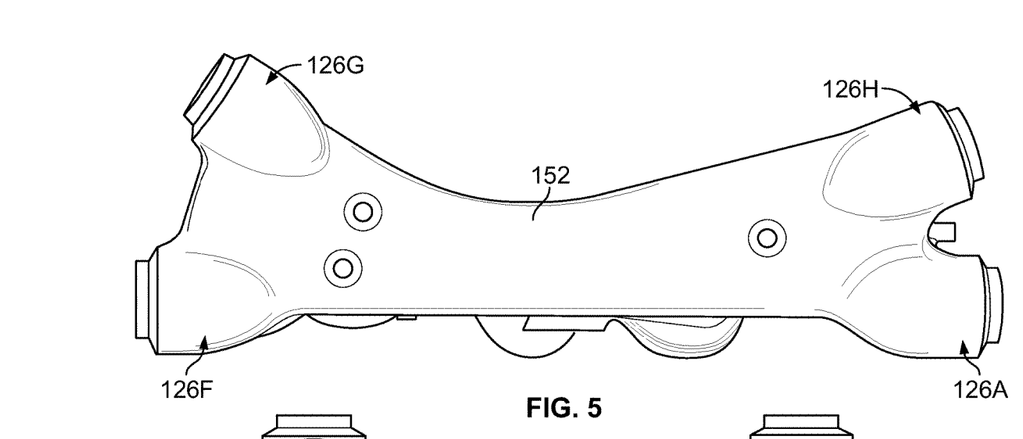
FIG. 5 is a bottom view of the node of FIG. 3.
Figure 6:
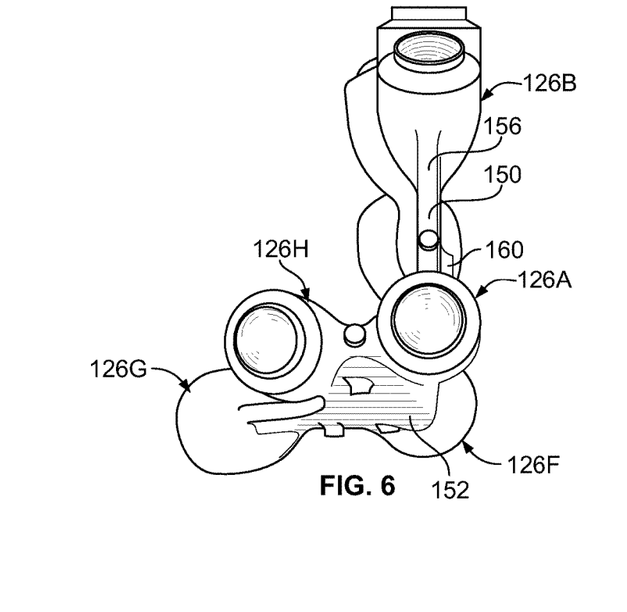
FIG. 6 is a front view of the node of FIG. 3.
Figure 7:
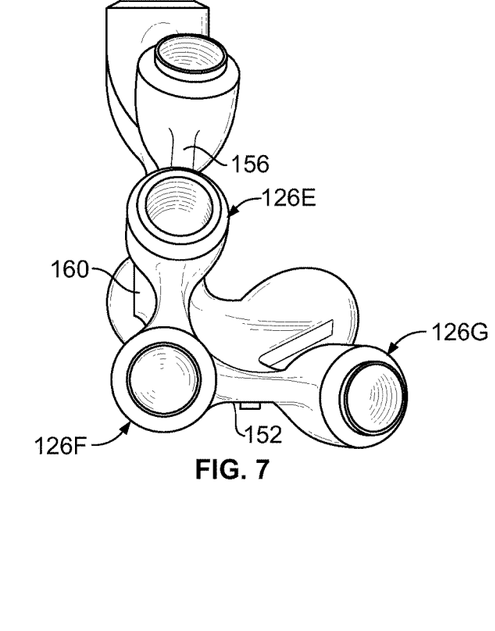
FIG. 7 is a rear view of the node of FIG. 3.

The node 122 includes body 128 including a first body portion 150 that interconnects node connectors 126A-F and extends along the first plane. The node 122 includes body 128 including a second body portion 152 that interconnects node connectors 126A, 126F and 126G, 126H and extends along the second plane substantially perpendicular to the first web portion.

Each of the first body portion 150 and the second body portion 152 may include a central portion 154 and web portions 156. The web portions 156 include material that extends between the node connectors 126 and attach the sidewall 142 of one node connector 126 to an adjacent one of the node connectors. For example, a web portion 156 spans the distance between the sidewall 142 of node connector 126B and node connector 126C. Another web portion 156 spans the distance between the sidewall 142 of node connector 126C and node connector 126D.

The central portion 154 may include an attachment fixture 160. The attachment fixture 160 may include a flat surface 162 with a plurality of tapped or untapped holes 164. While the attachment fixture 160 is shown disposed on the first body portion 150, the attachment portion may be located on the second body portion 152 or other suitable body portions if present. The attachment fixture 160 is configured to receive a wide range of attachments, in the form of brackets, frame elements, vehicle elements, wiring, hydraulic lines, sensors, motors, mechanical elements, hydraulic elements, electromechanical elements, subframes, and/or any other suitable part, and combinations thereof.

Figure 8:
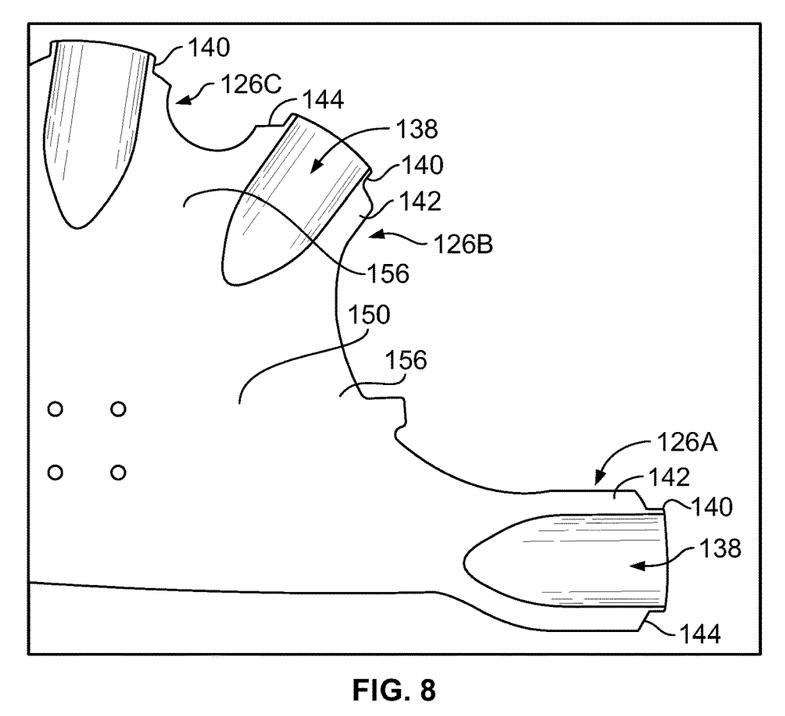
FIG. 8 is a partial cross section view of the node of FIG. 3.
Figure 9:
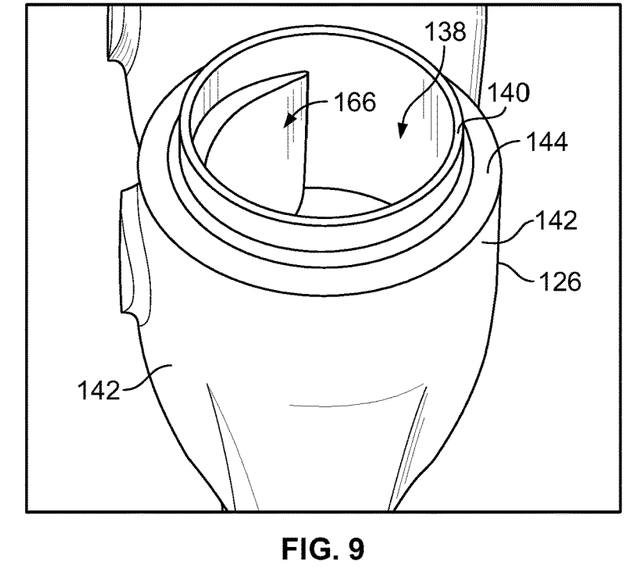
FIG. 9 is a close up view of one of the tube attachment portions of the node of FIG. 3.

Referring to FIG. 8 and FIG. 9, each of the node connectors 126 (126A, 126B, and 126C is shown) includes a sidewall 142 that extends outwardly from the web portion 156 of the first body portion 150. The sidewall 142 terminates with a tenon 140, which is circular. In between the sidewall 142 and the tenon 140 is the transition 144, which narrows in radial diameter in the direction from the sidewall to the tenon. Thus, the transition 144 presents a truncated cone shape.

In one embodiment, shown in FIG. 9, the interior 138 of the node connector 126 may include sidewall reinforcement 166, which is an area of the sidewall 142 that is radially thicker than other areas of the sidewall. The sidewall reinforcement 166 may be formed in a node connector 126 to provide reinforcement in an area of the node connector that is presented with a higher load than node connectors in other parts of the node 122.

Figure 10:
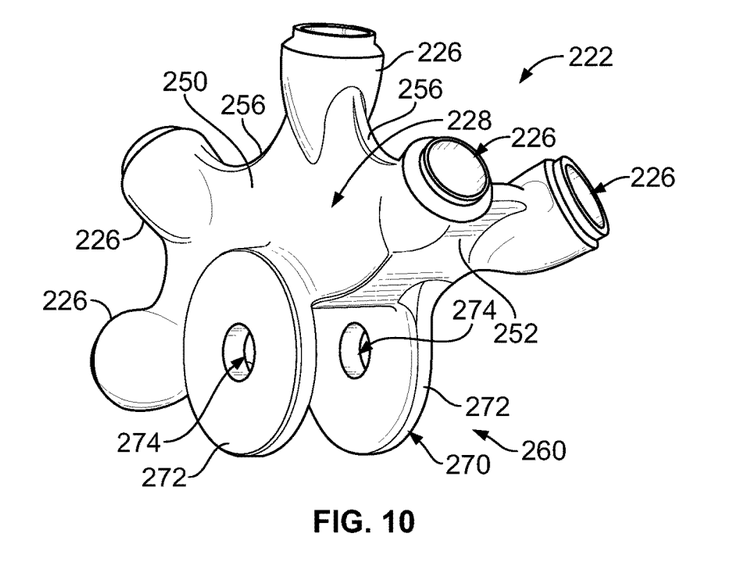
FIG. 10 a perspective view of a node according to a third embodiment of the present disclosure.
Figure 11:
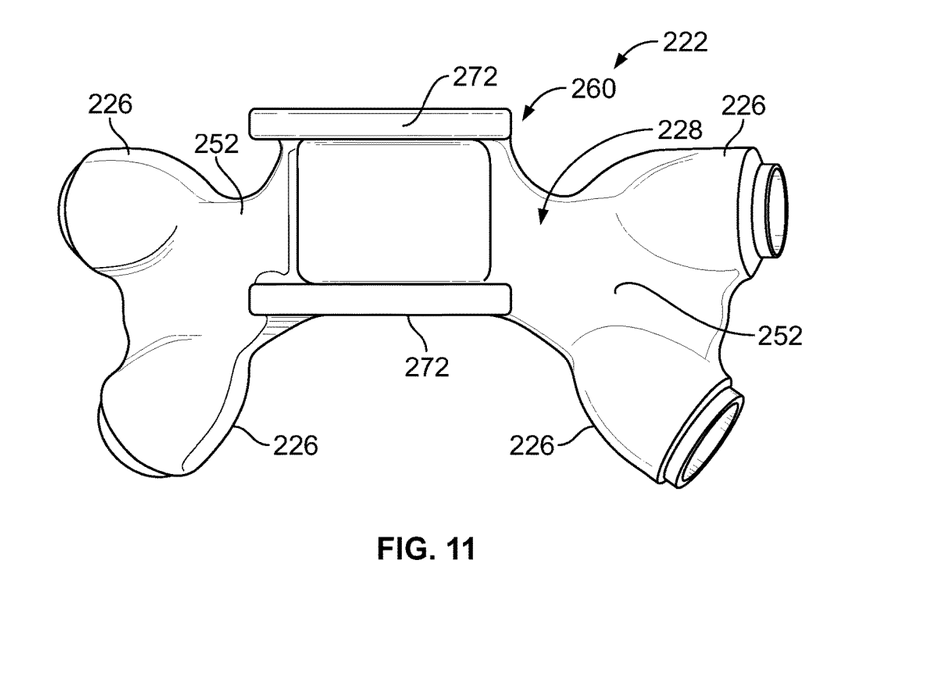
FIG. 11 is a bottom view of the node of FIG. 10.
Figure 12:
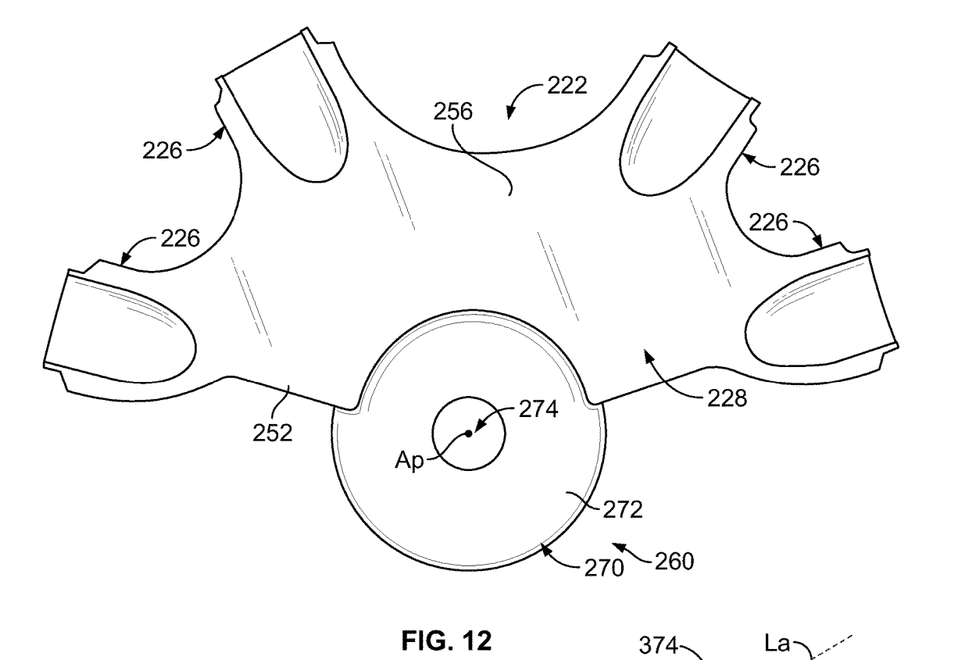
FIG. 12 is a lengthwise cross section view of the node of FIG. 10.

FIGS. 10-12 illustrate another node 222 according to a further embodiment of the disclosure. The node 222 is similar to preceding embodiments with a different type of attachment fixture 260, which may be in the form of a pinned joint. The attachment fixture 260 includes a fork 270 including a pair of parallel and spaced plates 272, each plate provided with an opening 274 sized and shaped to receive a pin (not shown). A structural or other frame member, such as the eyelet end of a rod (not shown) may be movably attached to the fork end 270 via a pin as is well known. The opening 274 of the fork 270 may be located at the point (Ap) of the node connector axes.

The fork 270 is formed of and extends from the node body 228. The node body 228 includes a first body portion 250 and a second body portion 252, from which a plurality of node connectors 226 extends outwardly. Each of the node connectors 226 may be configured in the manner as in the above embodiments, and may be arranged about the node body 228 to suit any arrangement of angles and orientations.

FIGS. 13-16 illustrate another node 322 according to yet another embodiment of the disclosure. The node 322 is similar to preceding embodiments with a different type of attachment fixture 360, which may be in the form of a pinned joint similar to that of the embodiment of FIGS. 10-12. Further, the node body 328 has a different overall configuration than previous embodiments.

Figure 13:
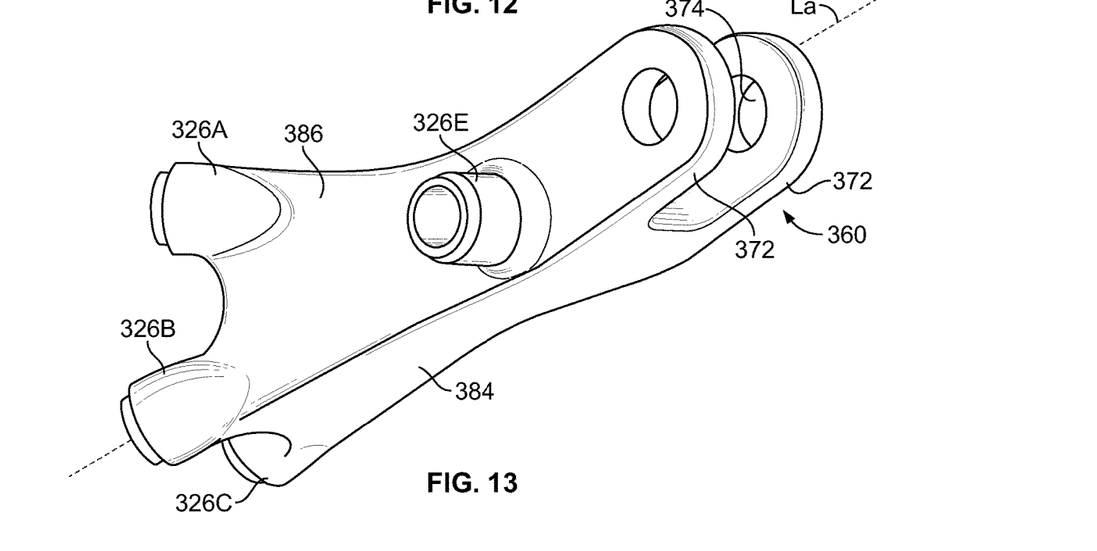
FIG. 13 a perspective view of a node according to a fourth embodiment of the present disclosure.
Figure 14:
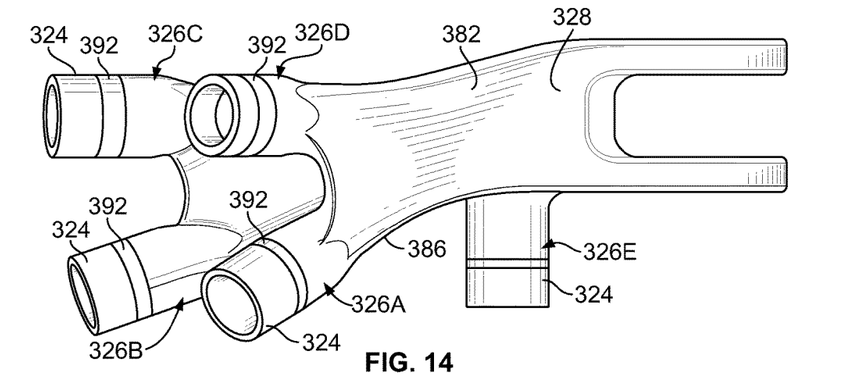
FIG. 14 is a top view of the node of FIG. 13 with short tube sections in position.
Figure 15:
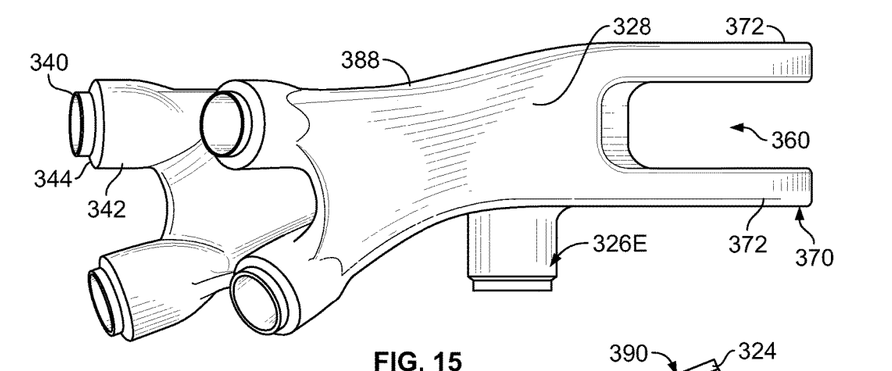
FIG. 15 is a top view of the node of FIG. 13 without tubes.

The node 322 includes a node body 328 that is generally elongate and rectangular. Four node connectors 326A-D are disposed at a first end 376 of the rectangle. The attachment fixture 360 is disposed at a second end 378 opposite the first end 376. A fifth node connector 326E is disposed between the first and second end 376, 378 and generally normal to the longitudinal axis (La) of the node 322.

The node body 328 includes an upper body portion 382 that extends between node connectors 326A and 326D. The node body 328 includes a lower body portion 384 that extends between node connectors 326B and 326C. The node body 328 includes a first side portion 386 that extends between node connectors 326A and 326B. The node body 328 includes a second side portion 388 that extends between node connectors 326C and 326D.

The attachment fixture 360 includes a fork 370 including a pair of parallel and spaced plates 372, each plate provided with an opening 374 sized and shaped to receive a pin (not shown). A structural or other frame member, such as the eyelet end of a rod (not shown) may be movably attached to the fork 370 via a pin as is well known.

Figure 16:
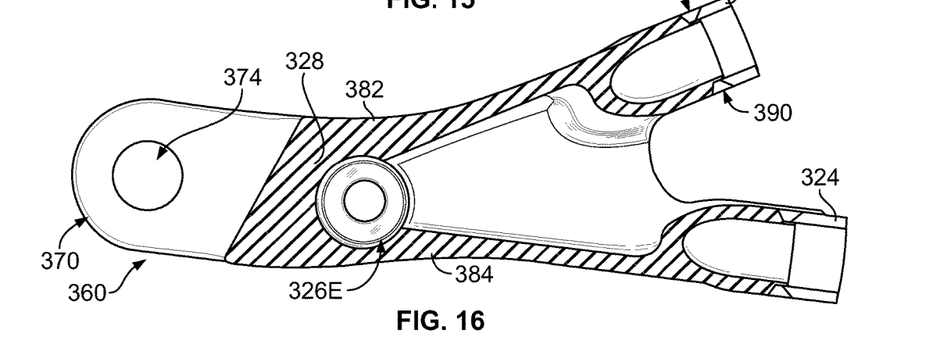
FIG. 16 is a cross section view of the node of FIG. 14.

The fork 370 is formed of and extends from the node body 328. Each of the node connectors 226 may be configured in the manner as in the above embodiments, and may be arranged about the node body 328 to suit any arrangement of angles and orientations. FIG. 14 shows short lengths of frame members 324 in position on node connectors 326A-E. The frame members 324 are welded in position with weld 392. Referring also to FIGS. 15 and 16, the welds 392 encircle the tenon 340 and over the transition 344 at the end of sidewalls 342 of each of the node connectors 326A-E. The welds 392 fill the annular, triangular space between the end of frame members 324 and the transition 344. The space between the end of frame members 324 and the transition 344 may be other, similar shapes. Locating the welds 392 in the position shown permits inspection of the weld.

Various embodiments disclosed herein are to be taken in the illustrative and explanatory sense, and should in no way be construed as limiting of the present disclosure.

INDUSTRIAL APPLICABILITY

Frames constructed with the disclosed nodes may be used in vehicles, machinery, building construction and other, similar applications wherein space frames are typically employed. The nodes disclosed herein have, as a result of having a unitary, single-piece body construction of a solid material, may connect to other elements of a space frame, or elements of the vehicle, by providing a fixture or mechanism to attach directly to the node, as opposed to only the tube-receiving node connectors. While also receiving and distributing loads from the frame and vehicle, the disclosed node bodies offer a further attachment point or area and thereby provide an additional functionality absent in prior art devices.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A node for interconnecting frame members of a frame, the node comprising:
   a single piece node body; and
   a plurality of cup-shaped node connectors disposed on the node body, each of the plurality of node connectors comprising:
      a closed end attached to the node body;
      an open end opposite the closed end and extending away from the node body;
      a sidewall extending between and connecting the closed end to the open end;
      a tenon formed on the open end, the tenon shaped and sized to fit within a frame member; and
      a beveled transition between the sidewall and the tenon whereby the transition defines a peripheral, radially outwardly facing groove in cooperation with an end surface of the frame member seated on the tenon, the groove shaped and sized to receive a weld.

2. The node of claim 1, wherein the node body is sized and shaped to accommodate an attachment fixture.

3. The node of claim 2, wherein the node body includes a central portion comprising the attachment fixture.

4. The node of claim 3, wherein the attachment fixture includes a flat surface, the flat surface including a plurality of holes, the holes sized and shaped to receive fasteners.

5. The node of claim 2, wherein the attachment fixture includes a fork end, the fork end sized and shaped to function as a pinned joint.

6. The node of claim 5, wherein the fork end includes a pair of parallel and spaced plates with openings sized and shaped to receive a pin.

7. The node of claim 1, wherein the node body includes web portions extending between adjacent pairs of the plurality of node connectors.

8. The node of claim 1, wherein the frame members are cylindrical.

9. The node of claim 8, wherein the frame members are hollow.

10. The node of claim 9, wherein the tenon is round and sized to fit within a frame member.

11. The node of claim 1, wherein the transition is a truncated cone-shaped shoulder between the sidewall and the tenon.

12. The node of claim 11, wherein the tenon is a cylindrical extension of the sidewall with an outer diameter that is less than an outer diameter of the sidewall.

13. The node of claim 1, wherein the node body includes a first body portion and a second body portion, the first body portion laying in a first plane and the second body portion laying in a second plane, the first and second plane being substantially perpendicular to each other.

14. The node of claim 1, wherein the sidewall includes a reinforcement in the form of a thickened portion.

15. The node of claim 1, wherein the groove is V-shaped.

16. A frame for a vehicle, comprising:
a plurality of frame members, at least one of the plurality of frame members having an end surface;
a plurality of nodes interconnecting the frame members, each of the plurality of nodes comprising:
a single piece node body; and
a plurality of cup-shaped node connectors disposed on the node body, each of the plurality of node connectors comprising;
a closed end attached to the node body;
an open end opposite the closed end and extending away from the node body;
a sidewall extending between and connecting the closed end to the open end;
a tenon formed on the open end, the tenon shaped and sized to fit within the at least one of the plurality of frame members; and
a beveled transition between the sidewall and the tenon whereby the transition defines a peripheral, radially outwardly facing groove in cooperation with the end surface of the at least one of the plurality of frame members seated on the tenon, the groove shaped and sized to receive a weld.

17. The frame of claim 16, wherein the node body is sized and shaped to accommodate an attachment fixture.

18. The frame of claim 17, wherein the node body includes a central portion comprising the attachment fixture.

19. The frame of claim 18, wherein the attachment fixture includes a fork end, the fork end sized and shaped to function as a pinned joint.

20. The frame of claim 19, wherein the fork end includes a pair of parallel and spaced plates with openings sized and shaped to receive a pin.

* * * * *